(12) United States Patent
Struck

(10) Patent No.: US 9,471,543 B1
(45) Date of Patent: Oct. 18, 2016

(54) METHOD AND ASSOCIATED ALGORITHM AND FIRMWARE FOR EXTRACTING MAGNETOMETER SIGNALS FROM NOISE UTILIZING DIGITAL SIGNAL PROCESSING (DSP)

(71) Applicant: Jacob Struck, Sparta, NJ (US)

(72) Inventor: Jacob Struck, Sparta, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 317 days.

(21) Appl. No.: 14/208,113

(22) Filed: Mar. 13, 2014

(51) Int. Cl.
*G06F 17/15* (2006.01)

(52) U.S. Cl.
CPC ..................... *G06F 17/15* (2013.01)

(58) Field of Classification Search
CPC ........................................... G06F 17/15
USPC ................................. 708/420–426
See application file for complete search history.

(56) References Cited

U.S. PATENT DOCUMENTS 5,414,699 A * 5/1995 Lee ................... H04L 25/03038
370/342

* cited by examiner

*Primary Examiner* — Tan V. Mai
(74) *Attorney, Agent, or Firm* — John P. Discala

(57) ABSTRACT

A compact, computationally-efficient, firmware-resident version of a DSP autocorrelation function, extracts periodic information from noise-corrupted signals. The function adapts autocorrelation parameters in real-time either autonomously or via up-link commands from a ground-based system. The function calculates specific determination values that optimize the performance of the autocorrelation process for a specific application. The per-bit multiplication used by the function can be performed by logically ANDing each of the respective samples in the two arrays. The summation of the per-bit multiplication is an integer summation, rather than the more time-consuming floating-point summation. A further aspect of the present function is the utilization of a threshold detection process to discretize the correlation output estimate to a one-bit binary sample.

6 Claims, 4 Drawing Sheets

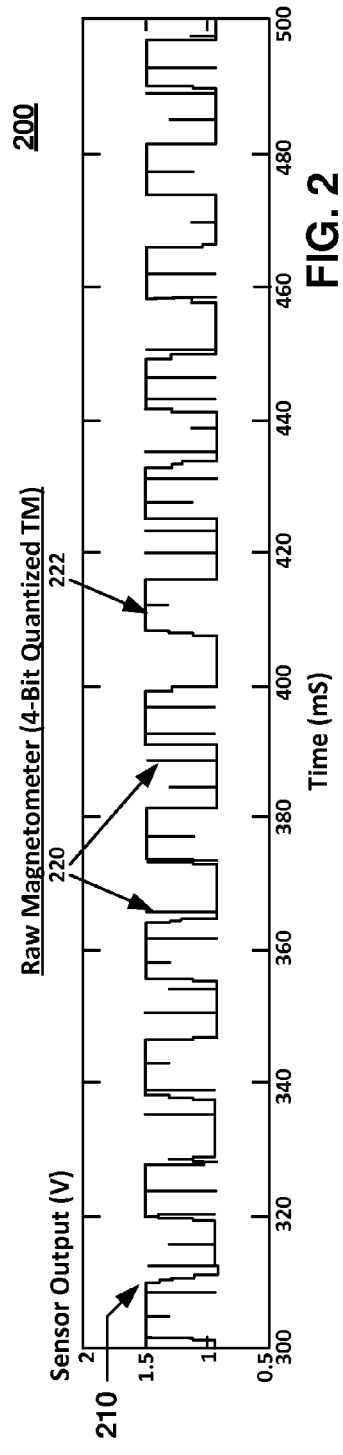
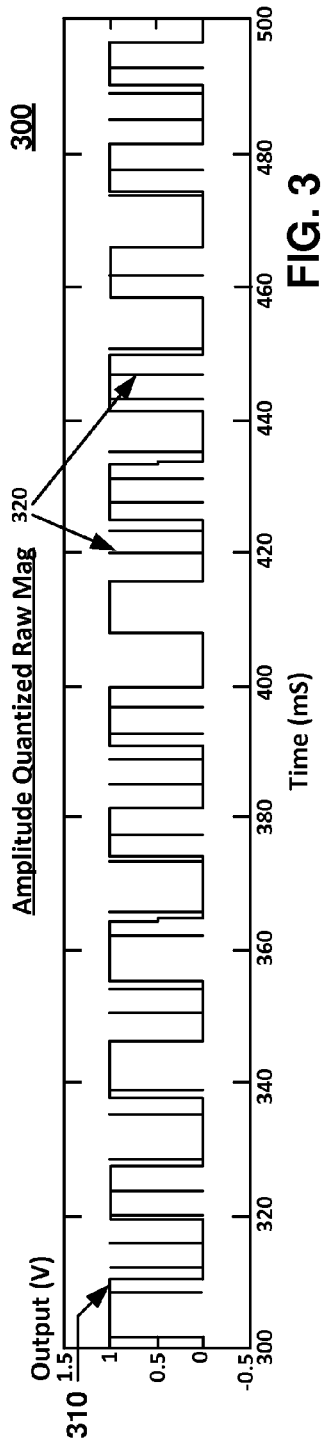
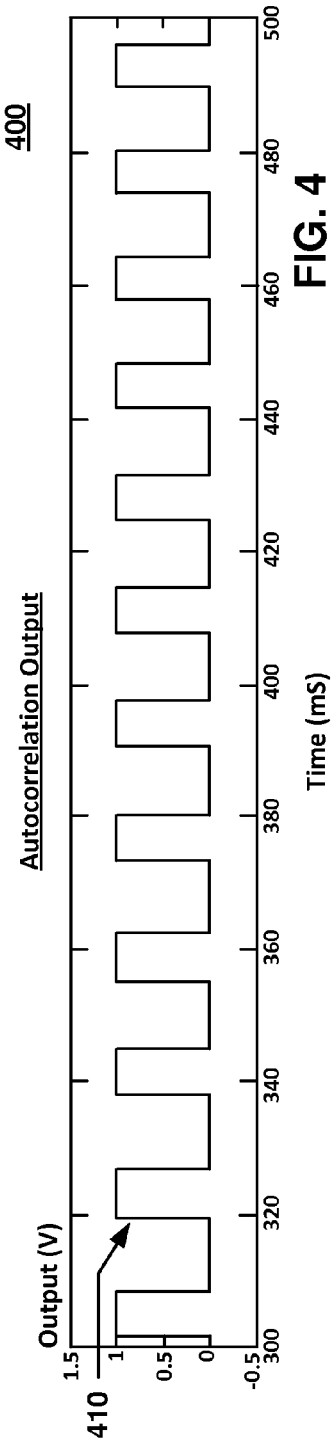

METHOD AND ASSOCIATED ALGORITHM AND FIRMWARE FOR EXTRACTING MAGNETOMETER SIGNALS FROM NOISE UTILIZING DIGITAL SIGNAL PROCESSING (DSP)

GOVERNMENTAL INTEREST

The invention described herein may be manufactured and used by, or for the Government of the United States for governmental purposes without the payment of any royalties thereon.

FIELD OF THE INVENTION

The present invention relates to the field of computing devices, and particularly relates to an automated digital signal processing (DSP) autocorrelation algorithm or function that significantly reduces the corrupting effects of interference on a sensor. More specifically, the autocorrelation algorithm may be used on-board a projectile in a very highly efficient manner with minimal impact on the on-board computational, energy, and payload resources.

BACKGROUND OF THE INVENTION

The magnetometer sensor on a spinning projectile is used to determine the projectile roll aspect angle with respect to the earth magnetic vector. Modern smart weapon technology requires great accuracy from this and similar sensors. The magnetic sensor requires relatively high-gain, low noise circuitry in order to produce clean, reliable magnetic vector crossing data to the on-board processor.

The high gain requirement of the magnetic sensor renders it susceptible to corrupting interference from a number of outside sources. The sources of interference can range from on-board currents and voltages, electromagnetic radiation within the projectile, unintentional off-board electromagnetic radiation emitters, and intentional disruptive sources.

Therefore, a need arises for a digital signal processing (DSP) autocorrelation algorithm that would significantly reduce the corrupting effects of interference. The algorithm would perform its sensing task, while being compact, computationally efficient. It would utilize mostly simple binary operations and some limited integer mathematics. As such, the algorithm would be highly time-efficient, with minimal impact on limited on-board computational and energy resources. The need for such a DSP autocorrelation algorithm has heretofore remained unsatisfied.

SUMMARY OF THE INVENTION

The present invention addresses the concerns related to interferences on sensors, and presents a new autocorrelation function that could be implemented by an algorithm (i.e., software), hardware, and/or firmware). The autocorrelation function is useful for extracting periodic information from noise-corrupted signals because of two of its unique properties.

The first property is that the autocorrelation of a periodic (i.e., coherent) signal has the same period as the signal.

The second property is that the autocorrelation of white (i.e., Gaussian) noise is zero, except for a Dirac Delta Function peak at t=0.

The continuous form of an autocorrelation Rff(τ) of signal f(t) with lag τ can be expressed by the following equation:

$$R_{ff}(\tau) = (f(t) * \bar{f}(-t))(\tau) = \int_{-\infty}^{\infty} f(t+\tau)\bar{f}(t)dt = \int_{-\infty}^{\infty} f(t)\bar{f}(t-\tau)dt, \quad [1]$$

where $\bar{f}$ represents the complex conjugate and * represents convolution. In the case of a real function, $\bar{f}=f$.

Since the data in this application is a time-sampled real function, a simplified discrete-time autocorrelation expression can be used.

For a discrete-time process of length n defined as $\{X_1, X_2, X_3, \ldots, X_n\}$ with known mean μ and variance $\sigma^2$, the estimate of the discrete autocorrelation is expressed by the following equation:

$$\hat{R}(k) = \frac{1}{(n-k)\sigma^2} \sum_{t=1}^{n-k} (X_t - \mu)(X_{t+k} - \mu) \quad [2]$$

for positive integers k<n. If the mean μ and the variance $\sigma^2$ are not known, the estimate could be biased in magnitude and offset.

Because the magnetometer signal has some unique properties and a known range of expected periodicity and amplitude, the discrete-time autocorrelation estimate can be further simplified and expressed by the following equation:

$$\hat{R}_n(k, l) = C_s \sum_{n=1}^{EoF} (X_{n-k}, \ldots X_{n+k})(X_{n-k+l}, \ldots X_{n+k+l}) \quad [3]$$

where $C_s$ is a scaling coefficient, n is the sample number, EoF is the End of Flight, k is the autocorrelation extent (half-extent) and l is the lag value; n, EoF, k and l all integers ≥1.

The magnetometer signal available to this process is a binary signal (its amplitude is quantized to either a logical "zero" or a "one"); so it can be considered to be discretely quantized in amplitude and continuous in time. Because of the signal characteristics, the actual correlation process can, at its minimal form, include an integer summation of a finite series of by-term, binary, one-bit logical ANDing operations.

With specific knowledge of the nature of the magnetometer signal and of the expected interference, the size of the autocorrelation extent $\{i-k, \ldots, i, \ldots, i+k\}=2k+1$, can be selected to enhance the desired signal, while suppressing the interference. The autocorrelation extent is selected so as to enhance the inherent periodicity (i.e., coherence) of the desired signal.

A similar selection is required for l, the autocorrelation lag value, which is selected to enhance the randomness (i.e., incoherence) of the undesired interference. The best combination of k and l will provide optimal results for this specific application. As used herein, optimal results enhance the desired signal while suppressing the interfering signal and its corrupting effects on the desired signal to a negligible level.

The autocorrelation algorithm can be implemented in an existing on-board field-programmable gate array (FPGA), a microprocessor, or on a DSP integrated circuit.

Additional aspects of the present invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 2 illustrates an exemplary MATLAB®-generated plot of a raw magnetometer signal with its corrupting signals that are shown as spikes within the desired square-wave-like signal;

FIG. 3 illustrates an exemplary plot of a signal available to an on-board field-programmable gate array that is performing the discrete-time autocorrelation, and which is shown as a binary-amplitude (i.e., either a logical "1" or "0") continuous time signal, wherein this continuous time signal must be sampled by the field-programmable gate array to produce a train of one-bit binary samples;

FIG. 4 is an exemplary plot of an autocorrelation output that is generated by the autocorrelation function according to the present invention;

DETAILED DESCRIPTION OF PREFERRED EMBODIMENTS

The present invention provides a novel and non-obvious automated digital signal processing (DSP) autocorrelation algorithm that significantly reduces the corrupting effects of interference on a sensor. More specifically, the autocorrelation algorithm may be used on-board a projectile in a very highly efficient manner with minimal impact on the on-board computational energy and payload resources. The process, computer program product, and the associated system are collectively referred to herein as "the algorithm," "the process," "the method," "the system," "the function," or "the computer program product".

Figure 1:
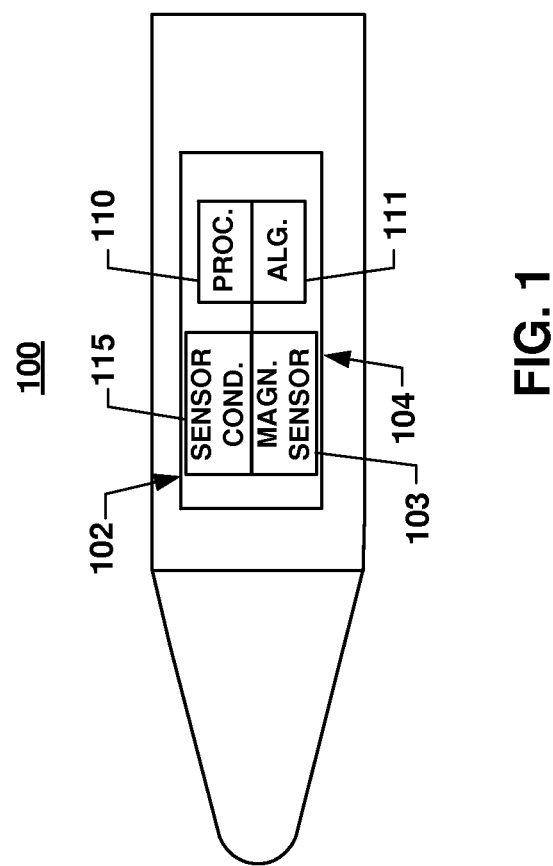
FIG. 1 is a generic, schematic view of a projectile that is provided with a DSP autocorrelation function, according to the present invention.

FIG. 1 is a generic, schematic view of a projectile 100 that is provided with a DSP autocorrelation function, according to the present invention. The projectile 100 is provided with an on-board electronics module 102 that contains a magnetometer sensor 103 and a signal processing circuit board 104 that generally incorporates a processor (or CPU) 110, a DSP autocorrelation algorithm 111 of the present invention, and a sensor conditioning (or signal conditioning) module 115.

The sensor conditioning module 115 is known in the field, and generally performs the following functions: analog amplification, filtering, squaring and level shifting of the magnetometer output for input into the processor 110.

The on-board processor 110 may be (or its function may be implemented) for example, by an off-chip, such as a microcontroller, a microprocessor, a Digital Signal Processor (DSP), or a Field-Programmable Gate Array (FPGA), a microcontroller, or a microprocessor, and/or by an on-chip non-volatile RAM or ROM.

Candidate sensors 103 may be, but are not limited to:
A magnetometer;
a magnetic flux sensor;
an electric field sensor;
a photoelectric sensor (spot or array, staring, scanning, or framing);
an accelerometer;
a velocimeter;
a gyroscope (laser, rotational, etc.);
a strain gage;
a force gage;
a displacement gage;
a pressure sensor;
a flow sensor;
a thermal sensor;
a tachometer; and/or
a position sensor (linear or angular).

FIG. 2 illustrates an exemplary MATLAB®-generated plot 200 of a raw magnetometer signal 210 with its corrupting signals that are shown as spikes 220 within the desired square-wave-like signal 222. The raw magnetometer signal 210 is outputted by the magnetometer sensor 103 and processed by the processor 110 and the DSP autocorrelation algorithm 111 as described herein, to generate the plot 400 of FIG. 4.

To this end, the DSP autocorrelation algorithm 111 changes the duty ratio (on-to-off time) of the desired magnetometer but, since the positive-going edge is used to determine roll orientation, its purity and stability are important parameters. By selecting the signal sampling rate and adjusting the values of k and l in the above equation [3], the autocorrelation can be "tuned" to accommodate a wide range of desired and corrupting signal combinations.

A further aspect of the present invention is to provide the ability to adapt the DSP autocorrelation algorithm 111 parameters in real-time within the on-board processor 110, either autonomously or via up-link commands from a ground-based system.

The foregoing equation [3] describes the mathematical operations performed by the DSP autocorrelation algorithm 111 and executed by the processor 110, to perform the simplified discrete-time autocorrelation operation.

The magnetometer signal 210 (FIG. 2) is sampled at a specific rate that is fast enough to update the samples in order to accurately define the time position of a transition in amplitude, but sufficiently slow to allow the on-board processor 110 to perform the simplified discrete-time autocorrelation for each new sample before the next sample is acquired. Otherwise, the autocorrelation output estimate will not be updated in real time (defined as processing time that is less-than-or-equal-to the time between successive samples).

An exemplary train of the sampled magnetometer signal 310 is illustrated in FIG. 3. The DSP autocorrelation algorithm 111 effectively removes the corrupting noise 220 (FIG. 2), 320 (FIG. 3) or reduces it to a level that is no longer significant, in order to generate the desired autocorrelation output signal 410 (FIG. 4).

The autocorrelation as embodied in equation [3] requires 2k+l samples to be acquired before the first autocorrelation estimate output is made available. The time to acquire these samples defines the startup time. The first k+1 samples are not necessarily updated by the DSP autocorrelation algorithm 111 since the process requires a symmetric array of k samples on each side of the sample to be updated. The sample to be updated by the autocorrelation is the $n^{th}$ sample in the train.

Once 2k+l samples are acquired, each successive sample can be updated by the DSP autocorrelation algorithm 111. An aspect of the present invention is to determine the specific determination values of k and l that optimize the performance of the autocorrelation process for a specific application.

Figure 5:
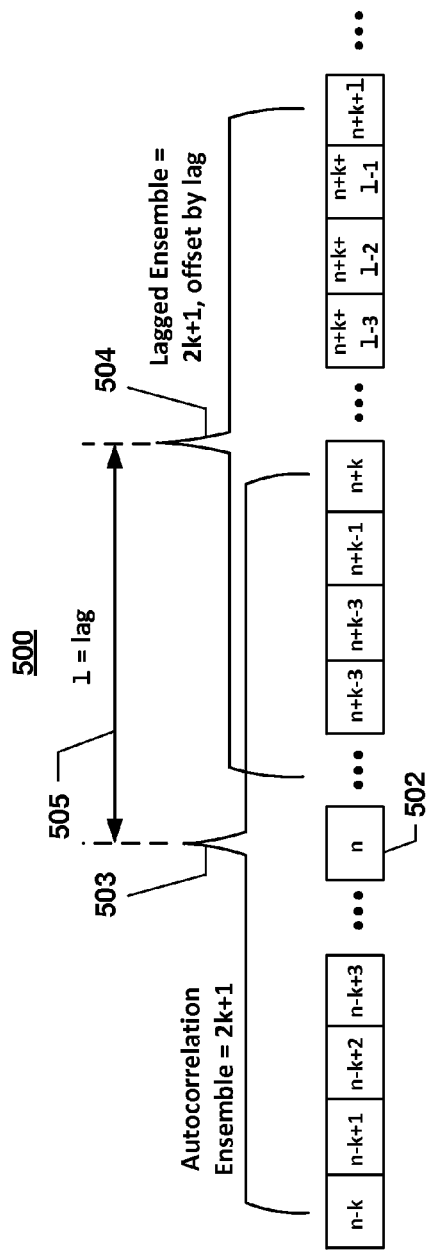
FIG. 5 represents a train of samples of the magnetometer signal that are sampled at a specific fast rate to update the samples, for accurately defining the time position of a transition in amplitude, wherein the sampling rate is sufficiently slow to allow the field-programmable gate array to perform a simplified discrete-time autocorrelation for each new sample before the next sample is acquired.

The DSP autocorrelation algorithm 111 performs a discrete-time autocorrelation (DTA) process 500, which is illustrated in FIG. 5. The DTA process 500 requires two arrays or sequences of data. The first array 503 includes a sequence of 2k+1 samples (Autocorrelation Ensemble), centered on the nth sample 502. The second array 504 includes a similarly sized array of samples (Lagged Ensemble) that is delayed by a lag, 1 (505).

The signal available to the on-board processor 110 that is performing the DTA process 500 is a binary-amplitude (either a logical "1" or "0"), continuous time signal, as shown of FIG. 2. The conditioned magnetometer signal 210 (FIG. 1) is sampled by the on-board processor 110 to produce a sequence 310 of one-bit binary samples.

Figure 6:
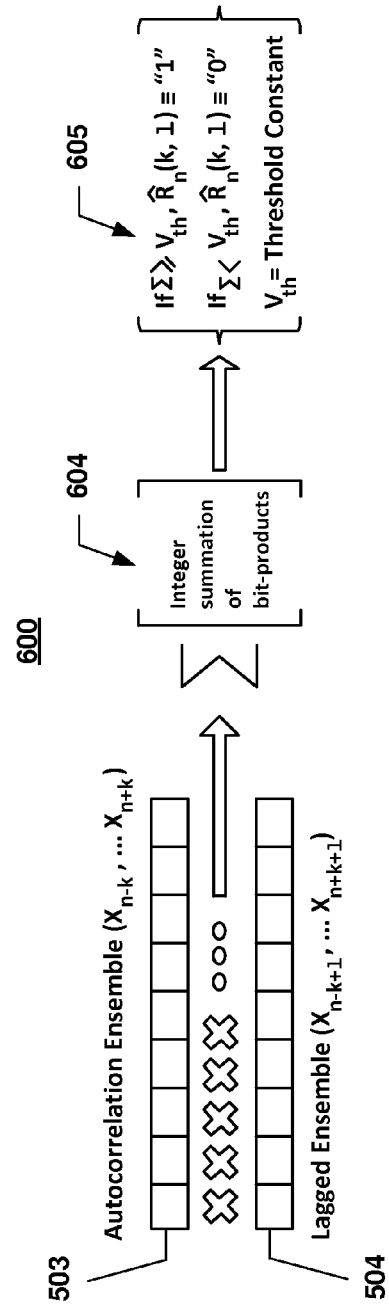
FIG. 6 represents a continuous, binary-amplitude (either a logical "1" or "0"), time signal that is available to the field-programmable gate array performing the discrete-time autocorrelation function of the present invention, such that the continuous time signal is sampled by the field-programmable gate array to produce a train of one-bit binary samples, wherein the discrete-time autocorrelation function requires a per-sample multiplication of the two arrays, which produces an array of 2k+1 values.

The DTA process 500 requires a per-sample multiplication of the two arrays 503, 504, as depicted in FIG. 6. That multiplication will produce an array of 2k+1 values. One of the aspects of the present invention is that this per-bit multiplication can be performed by logically ANDing each of the respective samples in the two arrays (Autocorrelation Ensemble 503) and (Lagged Ensemble 504), to result in a single array 604, with conditions 605.

The DTA process 500 also requires summing all of the products of the per-bit ANDing, rather than performing a more time-consuming binary or floating-point multiplication. Another aspect of the present invention is that this summation is an integer summation, rather than the more time-consuming floating-point summation.

A further aspect of the present invention is the utilization of a threshold detection process to discretize the correlation output estimate waveform 410 to a one-bit binary sample. The value of $V_{th}$ in a threshold detector can also be selectively "tuned" for specific applications.

Figure 7:
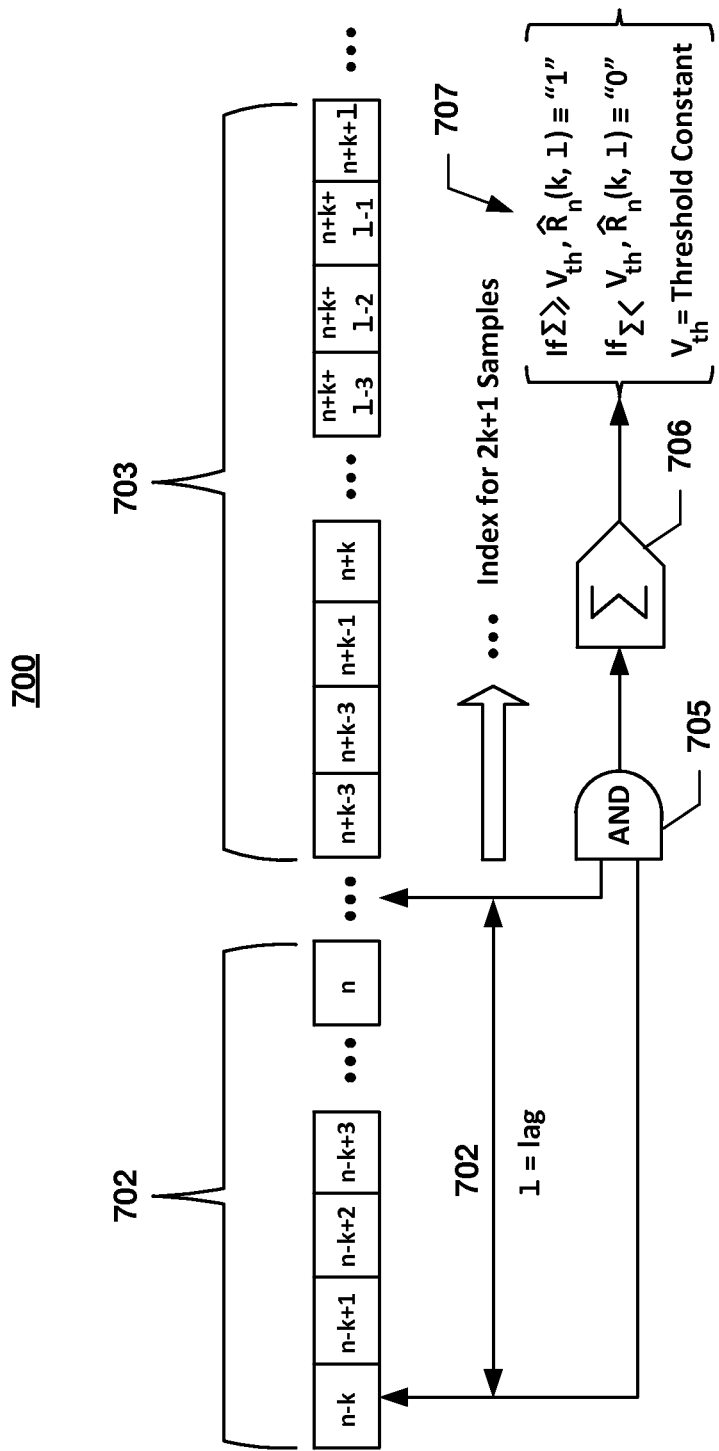
FIG. 7 Represents an "in-place embodiment" of the present process, where a single sequence of discrete-time sampled train of data, where two address index pointers, separated by lag, L, address the two binary samples that are multiplied in the AND gate, where the summation register adds successive multiplications in the autocorrelation algorithm, and wherein the threshold detection logic evaluates the output of the summation operation according to the rules in the threshold logical statements.

Another embodiment of the present invention is the employment of an "in-place" discrete-time autocorrelation (DTA) process 700 (FIG. 7), where a register space for only one data stream ensemble of length 2k+1+l is required. The DTA process 700 starts by setting two index pointers 702, 703 that are separated by lag=1 (704).

The DTA process 700 then examines the contents of samples n and n+l. The contents of these samples are logically ANDed by an AND gate 705 of the on-board processor 110. The two index pointers 702, 703 advance sample-by-sample until the final samples of the ensemble 2k+1 and 2k+1+l have been ANDed by the AND gate 705.

A summation block 706 of the on-board processor 110 integer-sums the output of each ANDing for all 2k+1 operations. When the sum of all 2k+1 operations has been accomplished, the final sum is subjected to a thresholding operation, where the final output 707 is assigned a logical one ("1") if the sum is greater-than-or-equal-to a predetermined threshold value; otherwise, it is assigned a logical zero ("0") if it is less than the threshold value.

When the summation exceeds the threshold value, the indexing, ANDing and summation may be terminated, as a possible speed-up measure, since that data point value has been determined. The ANDing, summation and thresholding steps are completed before the ensemble acquires a new data sample, advances (shifts) all samples towards the end of the ensemble, and discards the oldest sample.

The "in-place" DTA process 700 is again performed; once for each new sample to produce an output data stream, which is the best estimate of the desired signal, without the corrupting signal. This process 700 uses less on-chip register space than a multi-register embodiment.

As with all linear and causal processes, there are inherent latencies and delays associated with these processes. More specifically, as the magnetometer signal 210 begins (for example, just after muzzle exit and bootup time), the DTA process 500, 700, requires 2k+1 time samples to be acquired before its output is available. This delay is referred to as latency or pipeline delay. After that delay, the DTA process 500, 700, continues on a per-sample rate (that is a new autocorrelation output for each sample advance).

The processing or computational delay must be less-than-or-equal-to the signal sampling rate in order for the output of the DSP autocorrelation algorithm 111 to advance at a real-time rate. For an exemplary application, real-time operation is essential. The latency or pipeline delay should be less than the time for one revolution of spin at the highest expected spin rate of the projectile. If the spin acceleration exceeds certain values, spin acceleration compensation calculations and corrections are required as well.

Although k and 1 are expressed as integer sample numbers in the above equation [3], the absolute time values of k and 1 with respect to the signal time/frequency characteristics are the controlling parameters of the DSP autocorrelation algorithm 111. Therefore, they are dependent on the signal sampling rate and the unique characteristics of the desired and interfering signals. The sampling rate must be fast enough to adequately update changes in signal state with their required time accuracy, while allowing enough inter-sample time to perform the algorithm's calculations.

The Discrete Correlation Function as well as the Discrete Convolution Function can be implemented in either the time domain or the frequency domain. In the frequency domain, both functions become similar by-term multiplications of their discrete Fourier Transforms (DFTs), followed by an inverse DFT of the product. In the case of arrays that contain floating-point values, there is generally a "break-even" point at an array size of approximately 256 samples, where it becomes more computationally efficient to perform the correlation in the frequency domain. An example of a frequency-domain correlation is shown in the following equation [4]:

$$\widehat{R_{AB}} = DFT^{-1}[DFT\{A\} \cdot DFT\{B\}], \quad [4]$$

Where DFT represents the discrete Fourier Transform, {A} is the autocorrelation ensemble 503, and {B} is the lagged ensemble 504. The frequency domain version of convolution may appear to be much more computationally efficient than the time domain version for the anticipated array sizes. However, upon considering the specifics of the particular magnetometer application, the break-even point occurs at much larger array sizes, since the data arrays include one-bit binary values per sample.

The mathematical operations include simple ANDing and accumulation of one fixed-point integer, where the DFT is calculated in at least a 32-bit, or possibly a 64-bit numerical precision (e.g., IEEE-754 binary floating-point standard) to avoid truncation errors from propagating through the DFT process and corrupting the results.

This is independent of the nature of the input array (whether it is one-bit binary or full-precision floating-point), since the DFT array calculations internal to the process involve numerous sinusoidal coefficient multiplications and floating-point additions. For computational efficiency within the DFT, the two arrays are also $2^n$ long (integral powers of 2), where in the time domain, they can be of any length but, for symmetry, the length is an odd number (2k+1).

The break-even point in the specific application will be determined by the numerical precision of an off-chip (i.e., Field-Programmable Gate Array (FPGA), Digital Signal Processor (DSP), microcontroller, or microprocessor) as well as by the nature of the math libraries used to implement the DFT processes. With the nature of the data (one-bit binary samples) and with the array sizes expected to be utilized in this specific application, the time-domain implementation will prove to be more computationally efficient.

Although the present DSP autocorrelation algorithm 111 has been described in connection with one exemplary application, it should be clear that other modifications may be made to the DSP autocorrelation algorithm 111 without departing from the spirit and scope of the present invention.

Embodiments of the present invention can take the form of an entirely hardware, firmware, or software, or a combination thereof. In a preferred embodiment, the invention is implemented in hardware. For the purposes of this description, a computer-usable or computer readable medium can be any apparatus that can contain, store, communicate, propagate, or transport the program for use by or in connection with the instruction execution system, apparatus, or device, including but not limited to smart phones. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A computer program product that includes a plurality of sets of instruction codes stored on a computer readable medium for implementing a digital signal processing autocorrelation function that extracts periodic information from noise-corrupted signal, the computer program product comprising:
    a first set of instruction codes for adapting autocorrelation parameters in real-time;
    a second set of instruction codes for calculating specific determination values that optimize the performance of the autocorrelation function;
    a third set of instruction codes for performing per-bit multiplication by logically ANDing samples in two arrays;
    a fourth set of instruction codes for performing an integer summation of the per-bit multiplication to generate a correlation output estimate; and
    a fifth set of instruction codes for using a threshold detection process to discretize the correlation output estimate to a one-bit binary sample.

2. The computer program product of claim 1, wherein the autocorrelation parameters are determined and inputted autonomously.

3. The computer program product of claim 1, wherein the autocorrelation parameters are inputted via up-link commands from a ground-based system.

4. The computer program product of claim 1, wherein the autocorrelation parameters includes outputs from any one or more of the following sensors:
    a magnetometer;
    a magnetic flux sensor;
    an electric field sensor;
    a photoelectric sensor;
    an accelerometer;
    a velocimeter;
    a gyroscope;
    a strain gage;
    a force gage;
    a displacement gage;
    a pressure sensor;
    a flow sensor;
    a thermal sensor;
    a tachometer; and
    a position sensor.

5. The computer program product of claim 1, wherein any one or more of the first, second, third, fourth, and fifth sets of instruction codes reside on an off-chip, a memory medium, an on-chip non-volatile RAM, and an on-chip non-volatile ROM.

6. The computer program product of claim 1, wherein the computer readable medium includes any one or more of: RAM, ROM, and a magnetic medium.

\* \* \* \* \*